United States Patent [19]

Hamada et al.

[11] Patent Number: 5,845,080
[45] Date of Patent: *Dec. 1, 1998

[54] COMMUNICATION NETWORK MANAGEMENT APPARATUS USING A CACHE ARRANGED AS A RESULT OF A STATICAL ANALYSIS OF COMMUNICATION RELATED CHARACTERISTICS

[75] Inventors: Takeo Hamada; Kohei Iseda; Mitsuhiro Azuma; Takafumi Chujo, all of Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 508,780

[22] Filed: Jul. 28, 1995

[30] Foreign Application Priority Data

Mar. 3, 1995 [JP] Japan .................................. 7-044569

[51] Int. Cl.$^6$ ............................ G06F 13/00; H04M 3/42; H04M 15/00
[52] U.S. Cl. ............................ 395/200.54; 395/200.58; 711/141; 711/154; 379/113; 379/133; 379/207
[58] Field of Search ...................... 395/200.01, 200.11, 395/200.53, 617, 683, 182.01, 182.21, 800, 420, 445, 446, 455, 463, 468, 487, 497, 200.54, 200.58; 379/112, 113, 120, 133, 207; 711/210, 173, 160, 119, 141, 136, 154

[56] References Cited

U.S. PATENT DOCUMENTS

| | | | |
|---|---|---|---|
| 4,747,043 | 5/1988 | Rodman | 395/451 |
| 5,214,766 | 5/1993 | Liu | 395/451 |
| 5,394,531 | 2/1995 | Smith | 395/463 |
| 5,448,727 | 9/1995 | Annevelink | 395/612 |
| 5,588,138 | 12/1996 | Bai et al. | 395/497.04 |
| 5,608,893 | 3/1997 | Slingwine et al. | 395/468 |

*Primary Examiner*—Larry D. Donaghue
*Attorney, Agent, or Firm*—Helfgott & Karas, P.C.

[57] ABSTRACT

A method of controlling a telecommunication network management is disclosed. By the method, a managing subject of a telecommunication network carries out a management sequence for management information of the telecommunication network in an agent subject. The method comprises the steps of (a) locating a cache storing the management information in the managing subject; and (b) partitioning attributes of the management information into attribute classes corresponding to demands for cache coherency. In the method, the managing subject carries out the management sequence with a higher speed by accessing the cache, and manages the cache for each attribute class efficiently.

7 Claims, 21 Drawing Sheets

FIG. 2

```
S 1 0   crossConnection MANAGED OBJECT CLASS
            DERIVED FROM "Recommendation X.721: 1992":top;
            CHARACTERIZED BY crossConnectionPackage PACKAGE
               BEHAVIOUR crossConnectionBehaviour ;
S 5 0          ATTRIBUTES
                  crossConnectionId
                     GET,
                  "Recommendation X.721 : 1992":administrativeState
                     GET-REPLACE,
S 1 0 0           "Recommendation X.721 : 1992":operationalState
                     GET;
                  signalType
                     GET;
                  fromTermination
S 1 5 0              GET;
                  toTermination
                     GET;
                  directionality
                     GET;;;
S 2 0 0   REGISTERED AS {m3100objectClass 15 } ;
```

FIG. 5

```
S210   crossConnection MANAGED OBJECT CLASS
         DERIVED FROM "Recommendation X.721: 1992":top;
         CHARACTERIZED BY crossConnectionPackage PACKAGE
           BEHAVIOUR crossConnectionBehaviour ;
S250     ATTRIBUTES
             crossConnectionId      -- #pragma : AttributeClass.C
                 GET;
             "Recommendation X.721 : 1992":administrativeState
                                    -- #pragma : AttributeClass.B
S300             GET-REPLACE,
             "Recommendation X.721 : 1992":operationalState
                                    -- #pragma : AttributeClass.A
                 GET;
             signalType             -- #pragma : AttributeClass.C
S350             GET;
             fromTermination        -- #pragma : AttributeClass.C
                 GET;
             toTermination          -- #pragma : AttributeClass.C
                 GET;
S400         directionality         -- #pragma : AttributeClass.C
                 GET;;;
         REGISTERED AS  {m3100objectClass 15 } ;
```

FIG. 6

```
S510    /*
        type ''__ObjectInstance'' ''__ObjectId''
        is defined in X711 document.
        /*

S550    typedef __ObjectInstance ObjectInstance;
        typedef __ObjectId ObjectId;

interface crossConnection : X721__top, MO__top {
S600        readonly attribute ObjectId crossConnetionId;
            attribute enum administrativeState;
            readonly attribute enum operationalState;
            readonly attribute enum signalType;
            readonly attribute ObjectInstance fromTermination;
S650        readonly attribute ObjectInstance toTermination;
            readonly attribute enum directionality;
        } ;
```

ATTRIBUTE CLASS A

ATTRIBUTE CLASS B

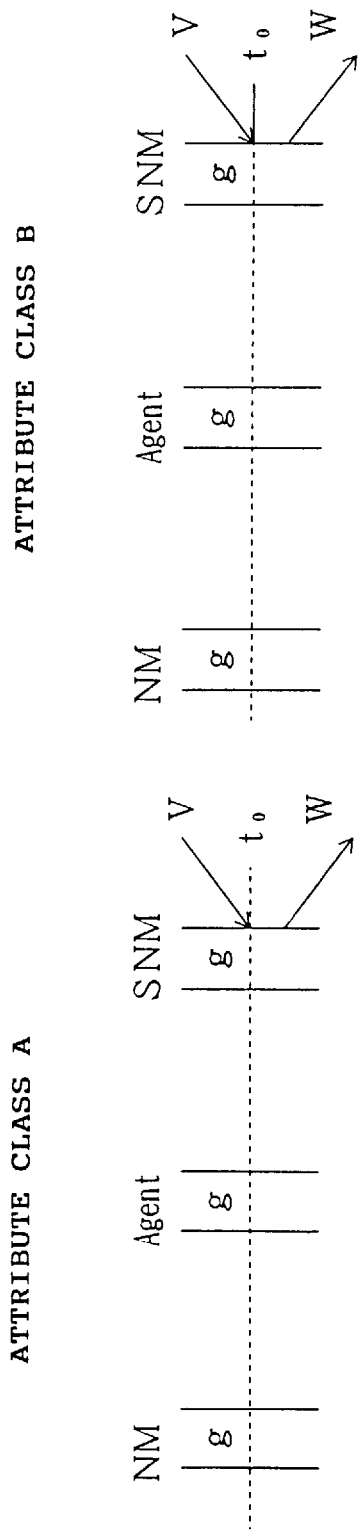

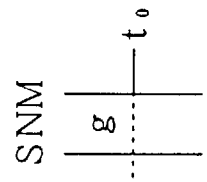
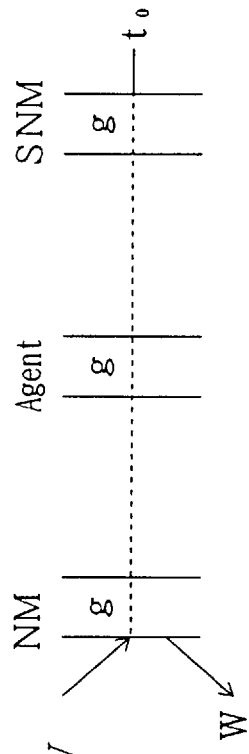
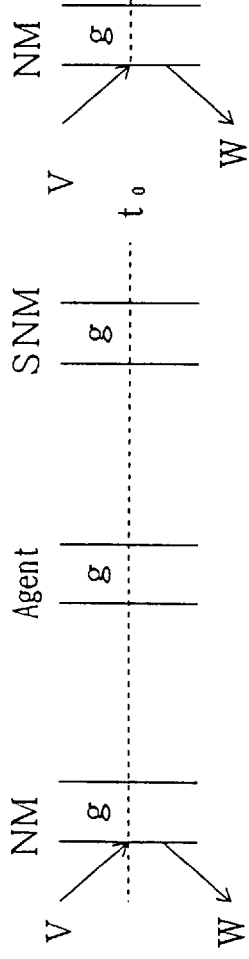

COMMUNICATION NETWORK MANAGEMENT APPARATUS USING A CACHE ARRANGED AS A RESULT OF A STATICAL ANALYSIS OF COMMUNICATION RELATED CHARACTERISTICS

BACKGROUND OF THE INVENTION

1. Field of the Invention

The present invention generally relates to a method of controlling telecommunication network management, and more particularly, to a method of controlling telecommunication network management for an object-oriented network.

Recently, development of network management of a telecommunication network is being promoted by demands for broad-band and highly reliable communication. A method of controlling telecommunication network management, which is called "telecommunication management network (TMN)", has been developed. For an international standard of the network management, a recommendation M.3100 for the TMN has been proposed by ITU-T (CCITT). For highly reliable and highly efficient network management, there is a need for a method of controlling the telecommunication network management which can meet a process load requirement of the network management and prevent an excessive delay on the telecommunication.

2. Description of the Prior Art

In telecommunication network management based on the TMN, management information such as conditions of communication apparatus and connection conditions of networks is represented by objects which are called "managed objects (MOs)". The telecommunication network management is controlled as follows: a management subject called "a manager" transmits a command to an agent subject called "an agent" by using a communication protocol called "a common management information protocol (CMIP)", and the agent operates an MO as an object of the management according to a content of the command.

A group of MOs in the agent is called "a management information base (MIB)". An attribute of an MO is an element of elements constituting the management information, and means, for example, a physical condition such as on/off of a switch.

For example, the manager can read (M-GET) or write (M-SET) an attribute of an MO, by transmitting a command of the CMIP to the agent. In general, the telecommunication network management is carried out in such a sequence (management sequence) using the CMIP commands.

When the telecommunication network management based on the TMN is applied to a large-scale network, an intra-network delay between the manager and the agent is increased. In addition to the intra-network delay, there is also a delay for protocol processing of the CMIP. As a result, a total delay time may be tens of milliseconds. There is thus a problem that in a management sequence in which the manager needs to frequently access attribute information of the MOs in the agent for supervising a traffic condition and a for checking possible problems in the network, it takes a long time to perform the management sequence.

On the other hand, a method for decreasing the intra-network delay by using a cache is previously known. By using the cache, an access time, more specifically, a time for reading an attribute of an MO can be extremely reduced. However, when the cache is used, it is necessary to ensure a coherency between contents of caches, and the coherency must be always maintained by using a coherency protocol. Therefore, as the number of the caches is increased, messages of the coherency protocol are also increased. Thus, management traffic is increased and the load of the network is increased, so that there is a danger that the network may fall into a congested condition in a certain operating method of the telecommunication network management. In the prior art, it is difficult to perform a reduction of the intra-network delay using the cache without increasing the management traffic in the network. Therefore, the cache technology is not widely used in the telecommunication network management.

To cope with a problem occurred in the agent, an attribute of an MO is stored in a data base, and when the problem is fixed, the attribute of the MO is returned from the data base. Further, for the above same purpose, by copying the attribute of the MO to plurality machines after the content of the attribute is changed, the attribute of the MO may be always maintained. In further detail, the data bases are located in plurality hosts, and after the content of the MO attribute is changed in one data base, the MO attribute is copied to other data bases. In the above methods, though a fault-tolerancy is improved, the copying is independent of the cache in the manager and is not used as the cache by the managing application in the manager. Therefore, the copying does not directly contribute to an increase in the processing speed of the telecommunication network management system. Also, when the cache is located independent of the copying, the data bases have the same information, which represents a low efficiency.

SUMMARY OF THE INVENTION

It is an object of this invention to provide a method of controlling telecommunication network management. The processing speed of a management sequence of the telecommunication network management can be increased. In the telecommunication network management, a cache management is optimized, and this optimization ensures a cache coherency and suppresses an increase of a management traffic. Also the cache is effectively used to fix a problem occurred in an agent. This permits the disadvantages described above to be eliminated.

The object described above is achieved by a method of controlling telecommunication network management, by which method a managing subject of a telecommunication network carries out a management sequence for management information of the telecommunication network in an agent subject, the method comprising the steps of: (a) locating a cache storing the management information in the managing subject; and (b) partitioning attributes of the management information into attribute classes corresponding to demands for cache coherency; wherein the managing subject carries out the management sequence with a higher speed by accessing the cache, and manages the cache for each attribute class efficiently.

The object described above is also achieved by the method mentioned above, wherein the method further comprises the step of (c) automatically generating an initializing element for keeping a cache area for each attribute class and setting an initial value by determining the attribute class from a definition of the management information.

The object described above is also achieved by the method mentioned above, wherein the method further comprises the step of (d) automatically generating an interface processing element for executing a coherency protocol for each attribute class by determining the attribute class from a definition of the management information.

The object described above is also achieved by the method mentioned above, wherein the method further comprises the step of (e) ensuring the cache coherency by using a coherency protocol corresponding to each attribute class.

The object described above is also achieved by the method mentioned above, wherein the method further comprises the step of (f) managing the cache based on a least-recently-used algorithm.

The object described above is also achieved by the method mentioned above, wherein the agent subject comprises a non-volatile storage element for storing management information of the managing subject connected to the agent subject.

The object described above is also achieved by the method mentioned above, wherein the method further comprises the step of (g) restoring, after a problem in the agent subject has been fixed, the management information of the agent subject by using the content of the cache in the managing subject which is stored in a non-volatile storage element.

According to the method of controlling the telecommunication network management, by locating the cache in the managing subject, the managing subject may execute the management sequence with extremely high speed. By partitioning the attributes of the management information into attribute classes corresponding to demands for cache coherency, cache management may be optimized.

According to the method of controlling the telecommunication network management, the initializing element is automatically generated by the definition of the management information, thereby the cache which was partitioned into the attribute classes is kept in the managing subject, and the cache is initialized. Therefore, interoperability with a system using no partitioned cache may be achieved.

According to the method of controlling the telecommunication network management, the interface processing element is automatically generated by the definition of the management information, thereby the coherency protocol for each attribute class is executed. Therefore, a proper coherent protocol may be executed for each attribute class.

According to the method of controlling the telecommunication network management, the cache coherency is ensured by using the proper coherency protocol corresponding to each attribute class. Therefore, this may prevent the management traffic of the network from increasing, and, thus, may suppress an increase in the network load.

According to the method of controlling of the telecommunication network management, the partitioned cache is managed based on the least recently used algorithm. Therefore, this may prevent the cache area from increasing, and, thus, may enable an effective memory use.

According to the method of controlling the telecommunication network management, the agent subject includes the non-volatile storage element. Therefore, when the problem occurs in the agent subject, the information of the managing subject connected to the agent subject may be kept.

According to the method of controlling of the telecommunication network management, after the problem which occurred in the agent subject is fixed, the management information of the agent subject is restored by using the cache in the managing subject. Therefore, the cache may be effectively utilized for the problem fixing in the agent subject.

Other objects and further features of the present invention will be apparent from the following detailed description when read in conjunction with the accompanying drawings.

BRIEF DESCRIPTION OF THE DRAWINGS

FIG. 2 shows an illustration for explaining a guideline of the definition of managed object (GDMO);

FIG. 5 Shows an illustration for explaining the GDMO in which pragma statements are included;

FIG. 6 show an illustration for explaining the definition of the IDL;

FIGS. 20A and 20B respectively show sequences of the attribute classes A and B in cases that a read request is generated when the management sequence is executed in the SNM; and FIGS. 21A and 21B respectively show sequences of the attribute classes A and B in cases that the read request is generated when the management sequence is executed in the NM.

DESCRIPTION OF THE PREFERRED EMBODIMENTS

Figure 1:
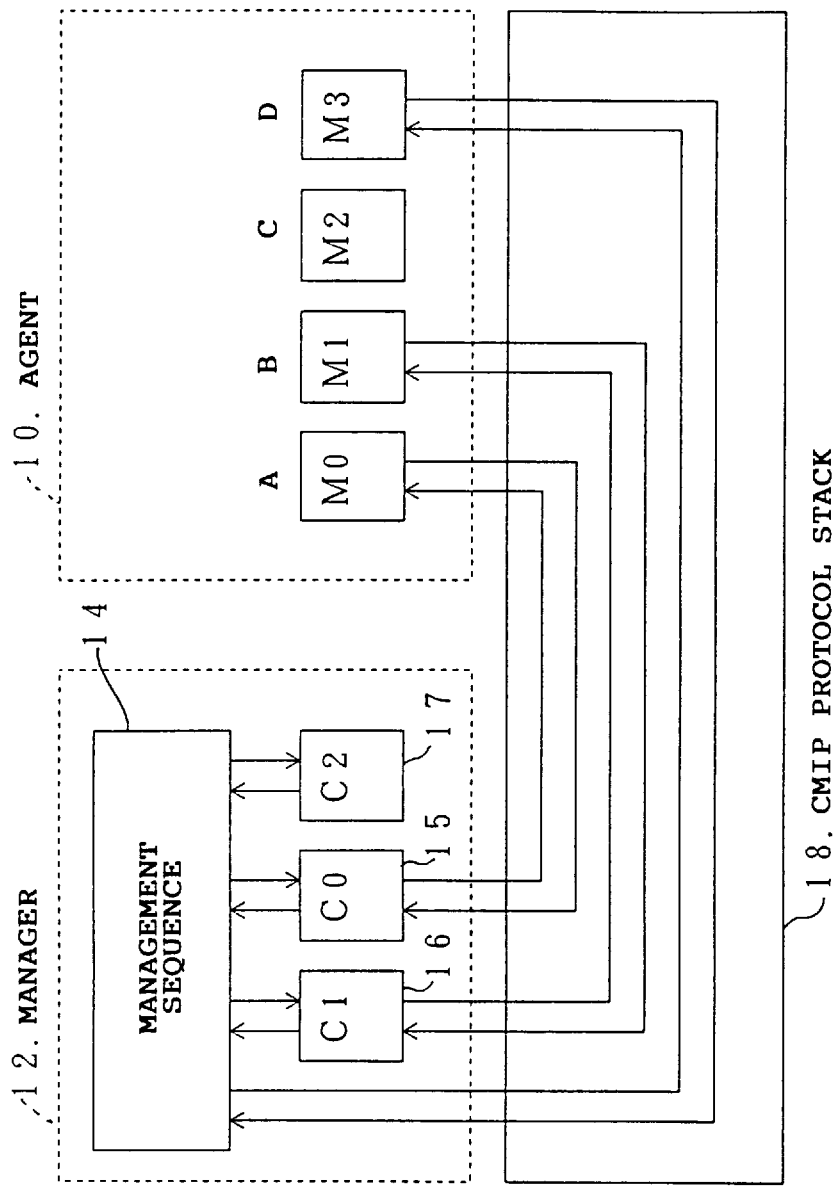
FIG. 1 shows an illustration for explaining a method of controlling telecommunication network management according to the present invention.

First, a description will be given of an embodiment of a method of controlling telecommunication network management according to the present invention, by referring to FIG. 1. FIG. 1 shows an illustration for explaining the method of controlling the telecommunication network management according to the present invention. In FIG. 1, an agent 10 partitions management information attributes into attribute classes according to physical characteristics and the necessity for a cache coherency, and manages resulting sets of management information M0 to M3 in respective attribute classes A to D.

A manager 12 has a management sequence 14, and caches 15, 16, 17. The caches 15 to 17 correspond to the sets of management information M0, M1, M2 of the attribute classes A to C, and respectively store sets of management information C0, C1, C2. A CMIP protocol stack 18 connects the agent 10 and the manager 12. Between the agent 10 and the manager 12, CMIP commands are transmitted and received, and the management information of the agent 10 are transmitted to the manager 12.

Next, a description will be given of the above attribute classes A to D.

The attribute class A is for MO attributes in which incoherency of the cache is temporarily permitted. This attribute class A contains GET-ONLY attributes which are permitted to be read out only by the manager 12 in response to the CMIP command "GET". This attribute class A includes MO attributes for supervisor information, MO attributes for pass-cost information, MO attributes for network statistic information, etc.

The attribute class B is for MO attributes requiring exact coherency. This attribute class B contains GET-REPLACE attributes which are permitted to be read and written onto by the manager 12 in response to the CMIP command "GET-REPLACE". This attribute class B includes MO attributes for cross-connect information of domain boundaries.

The attribute class C contains the GET-ONLY attributes, and is fixed when an MO is generated using an "M-CREATE" command of CMIP. This attribute class C is a fixed attribute class which does not change during a lifetime of the MO.

The attribute class D is for MO attributes in which there is no need to locate the cache, since few or no MO attributes are read out after this attribute is generated.

FIG. 2 shows an illustration for explaining a guideline of the definition of a managed object (GDMO). In FIG. 2, the MO attributes "crossConnectionId", "administrativeState", "operationalState", "signalType", "fromTermination", "toTermination", and "directionality" are represented. These MO attributes may be roughly partitioned into attribute classes based on the classes (GET, GET-REPLACE) of the GDMO shown in FIG. 2. To which of the classes an MO attribute belongs may be roughly determined by a physical feature (behavior) of the MO attribute. In FIG. 2, from steps S100, S110, the MO attribute "operationalState" is the GET-ONLY attribute which belongs to the attribute class A by its physical feature. From steps S80, S90, the attribute "administrativeState" is the GET-REPLACE attribute which belongs to the attribute class B. From steps S60, S70, S120 to S190, the attributes "crossConnectionId", "signalType", "fromTermination", "toTermination", "directionality" are respectively the GET-ONLY attributes which belong to the attribute class C by their physical features. In the example shown in FIG. 2, there is no attribute class D.

Since an attribute in the above attribute class C does not change after the attribute is generated, coherency between the management information C2 of the cache 17 in the manager 12 and the management information M2 in the agent 10 is always maintained. The attributes (the management information M0, M1) in the attribute classes A, B are respectively stored in the caches 15, 16 in the manager 12, and their coherency is maintained by a coherency protocol of the CMIP protocol stack 18. For the attribute (the management information M3) in the attribute class D, reading and changing the attribute is permissible.

Returning to FIG. 1, for the MO attribute in the attribute class C, communication between the manager 12 and the agent 10 is required only when an initial value is set. Therefore, in a conventional access, the CMIP is not necessary to maintain the cache coherency. For the attribute class D, in which there is little or no possibility of reading the attribute after the attribute is set, there is little need to apply the cache, and, thus, the cache is not used.

In the manager 12, when the management sequence 14 is carried out for the management information M0, M1, M2, the management information C0, C1, C2 of the respective caches 15, 16, 17 are respectively accessed instead of the management information M0, M1, M2, and for the management information M3, its attribute is directly controlled by using the CMIP command. In this way, the management sequence 14 may be performed with a higher speed. For the management information C0, C1, protocols based on demands of respective coherency are applied. Namely, for the attribute class A and the attribute class B, the attributes of the MOs in the agent 10 may be changed independent of the cache. Thus, it is necessary to ensure the coherency between the attribute content of the MO in the agent 10 and the content of the cache by using the coherency protocol. The attribute of the MO may be changed by an independent operation of the agent 10 or by the M-SET of other managers when plurality managers exist in the network.

Figure 3:
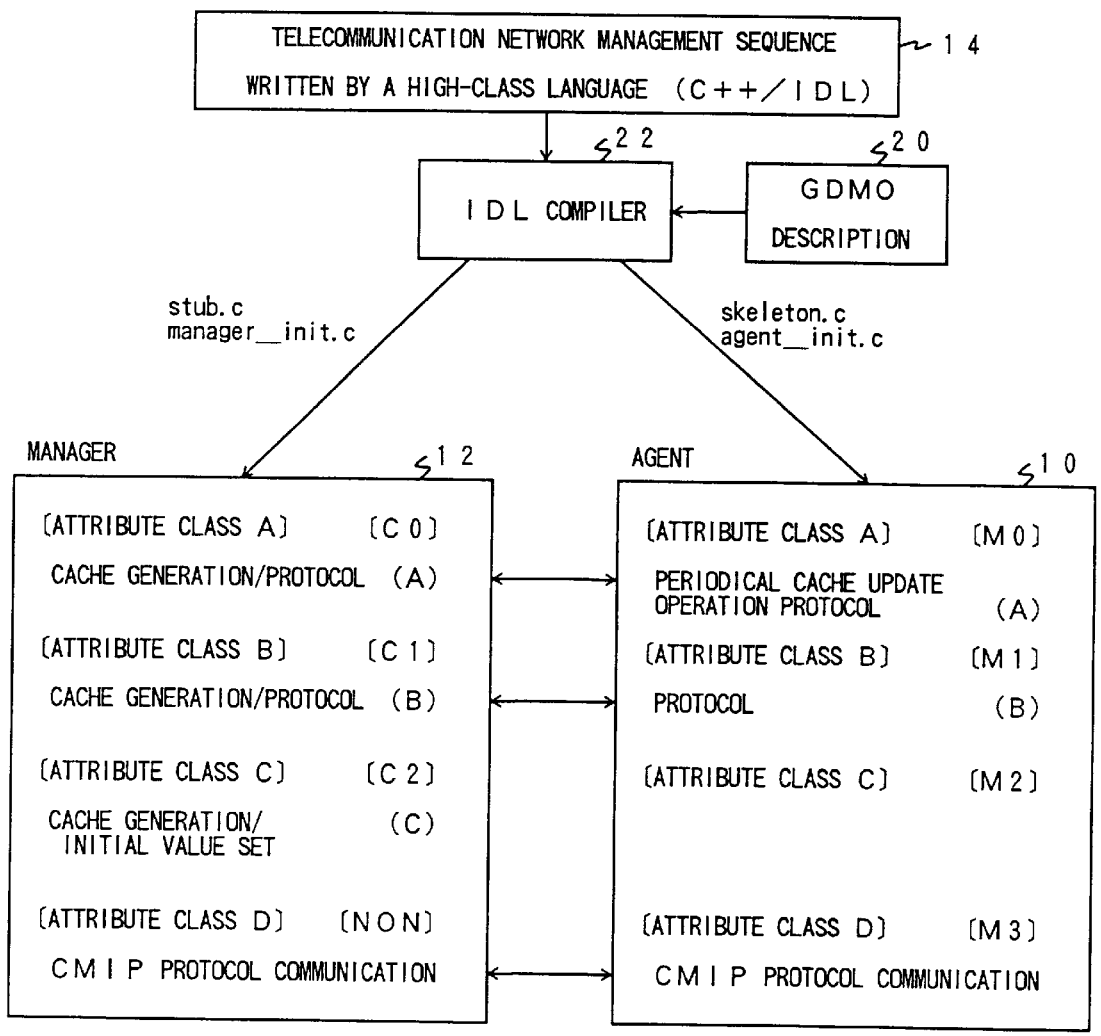
FIG. 3 shows a system flowchart for producing caches and setting initial values in TMN telecommunication-network-management control.

Next, a description will be given of automatic generation of an interface-processing-section program when compiling, by referring to FIG. 3. FIG. 3 shows a system flowchart for producing the caches and setting the initial values in the TMN telecommunication-network-management control. The management information M0 to M3, C0 to C2 correspond to those shown in FIG. 1. The management sequence 14 performed by the manager 12 is programed by using a high-class language such as C++ and an interface-description language such as IDL. An interface of accessing the MO by the CMIP is defined by the GDMO. An IDL compiler 22 refers a GDMO description 20 of the MO accessed by the telecommunication-network-management sequence, and automatically generates stub.c which is the interface-processing-section program (interface processing means) in the manager 12, manager_init.c which is an initializing program (initializing means) when the manager starts to operate, skeleton.c which is the interface-processing-section program (interface processing means) in the agent 10, and agent_init.c which is the initializing program (initializing means) when the agent starts to operate.

Since the attribute partitioning such as GET, GET-REPLACE, which are generally given in the MO description of the GDMO description shown in FIG. 2, does not give substantial information for the demands of the coherency, instructions to the IDL compiler 22 may be included in a comment as "pragma" (as shown in FIG. 5). When the IDL compiler 22 finds "pragma" in the comment which starts by "--", according to the instructions, the IDL compiler 22 keeps a cache area and selects the coherency protocol on the manager's side, and determines a method of accessing the cache in the future. In further detail, a program for keeping the cache area and setting the initial value is produced to manager_init.c, and a program for accessing to the cache is produced to stub.c. By also using the same information in programs used on the agent's side, the protocols corresponding to respective attribute classes are used. Therefore, the initializing program agent_init.c and the interface-processing-section skeleton.c are generated.

Such indications of the attribute classes by the "pragma" does not effect a transplantation of the telecommunication-network-management sequence nor a compiling of the telecommunication-network-management sequence by the conventional IDL compiler 22 without the cache. The reasons are as follows. From a standpoint of the program performing the telecommunication-network-management sequence, the presence of the cache is transparent and does not need to be conscious. Therefore, a result of running the program is independent of the presence of the cache. From a standpoint of the IDL compiler 22, this compiler understands the pragma statement as not the "pragma" but as the comment. Therefore, by using the conventional CMIP without using the cache, the telecommunication-network-management sequence is realized.

Figure 4:
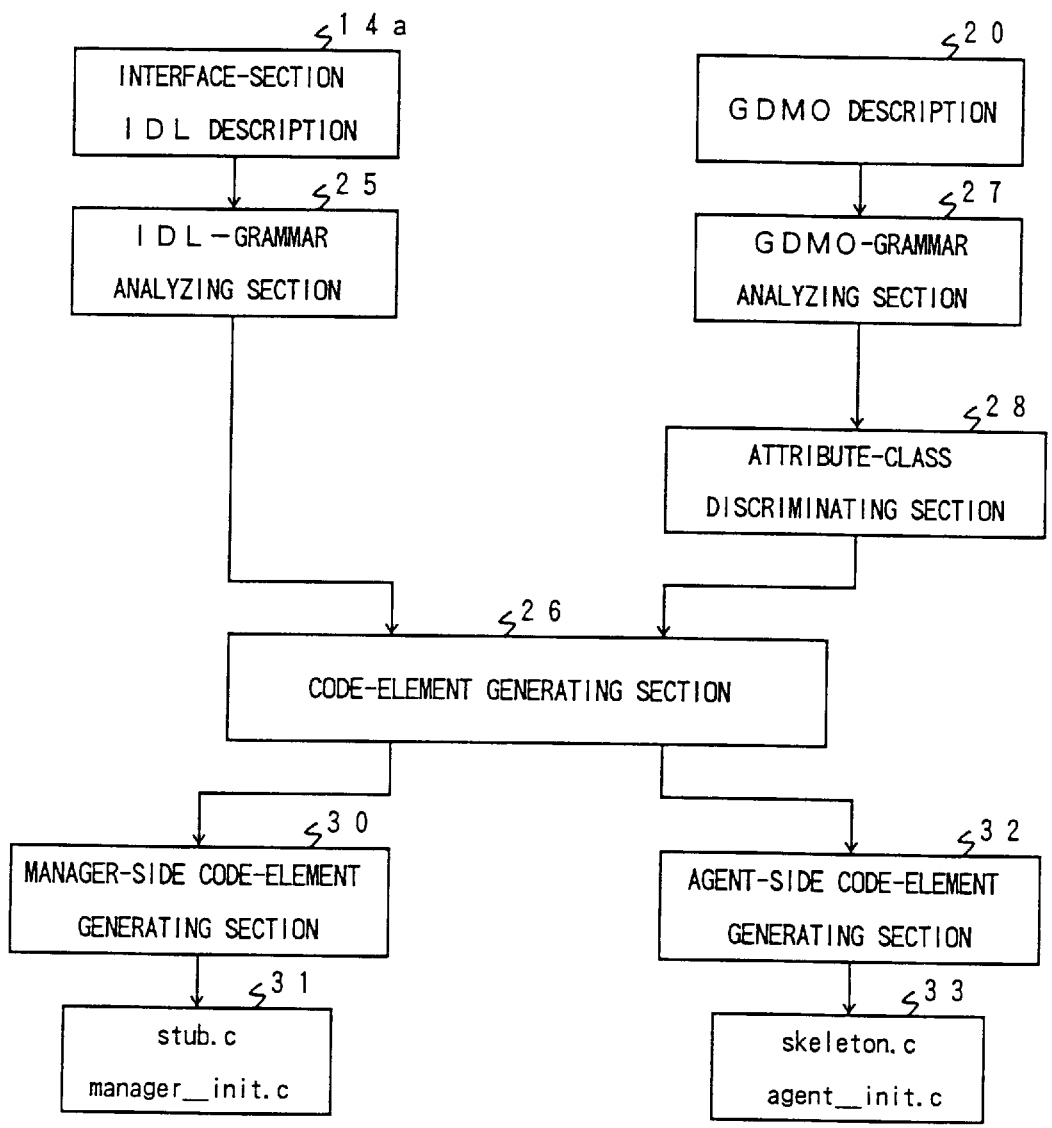
FIG. 4 shows a processing block diagram of an IDL compiler shown in FIG. 3.

FIG. 4 shows a processing block diagram of the IDL compiler 22. In FIG. 4, an IDL-grammar analyzing section 25 analyzes an interface-section IDL description 14a in the telecommunication-network-management sequence 14 and supplies the analysis result to a code-element generating section 26 which generates code elements for each attribute class. A GDMO-grammar analyzing section 27 analyzes a GDMO description 20. By using the analysis result, in an attribute-class discriminating section 28, the attribute class of the attribute element is discriminated and is supplied to the code-element generating section 26.

In the code-element generating section 26, based on the IDL-grammar analyzing result and the attribute-class discriminating result, the code element for each attribute class is generated. From the code element for each attribute class, a manager-side code-element generating section 30 generates programs stub.c and manager_init.c 31 which are used in the manager. From the code element for each attribute class, an agent-side code-element generating section 32 generates programs skeleton.c and agent_init.c 33 which are used in the agent.

FIG. 5 shows an illustration for explaining the GDMO in which the pragma statements are included. FIG. 6 shows an illustration for explaining an IDL definition. In FIG. 6, a definition of a data structure of a type such as _objectInstance or _ObjectId, etc., used in a step S520, is disclosed in a document of ITU-T. The IDL compiler 22 grammatically analyzes the IDL definition shown in FIG. 6 and generates the following code elements according to each attribute as portions of stub.c and skeleton.c. For example, for the attribute "crossConnectionId" in a step S260 shown in FIG. 5, since it is the GET-ONLY attribute a function, ObjectId crossConnection_set_crossConnectionId( );, is generated. For the attribute "administrativeState" in a step S270, functions, enum crossConnection_get_administrativeState( );

void crossConnection_get_administrativeState( ), are generated. In the conventional sequence using the CMIP, in the management sequence from the manager 12, the content of the attribute "administrativeState" can be referred to by the following equation:

adminState=crossConnection_get_administrativeState(o,ev).

The attribute content can be set by the following function.

crossConnection_set_administrativeState(o,ev, adminiStateValue).

Each function operated in the manager 12 is included in stub.c, and is the code element generated by the IDL compiler 22. In the above function, "o" is a pointer referring to the MO in the agent 10, and "ev" is a pointer indicating an environment variable. As the manager 12 executes the functions, crossConnection_get_administrativeState( ) and crossConnection_set_administrativeState( ), according to these functions, the agent 10 also executes the same name functions and performs referring to and updating of the actual attribute content of the MO. Each function executed in the agent 10 is included in skeleton.c, and is the code element generated by the IDL compiler 22.

Next, a description will be given of cache management. As for keeping the cache area, in the method according to the present invention, the cache area is allocated as a portion of the data area of the program carrying out the telecommunication-network-management sequence 14. Therefore, this way of keeping the cache area can be realized on a conventional operating system (OS) of personal computers and work stations, and needs no specific hardware and OS. For keeping the cache area, any configuration, in which the attribute of each MO to be cached corresponds to an area on a memory, may be applicable. Therefore, the above way can be easily realized by using a conventional memory.

In further detail, in response to the M-CREATE request from the telecommunication-network-management sequence 14, an MO instance is generated and the cache area associated with the MO attribute is simultaneously taken in the cache in the manager 12. Or, when an access request is generated from the manager to the MO of the agent in response to the M-GET and M-SET requests, the cache area is taken. And, when the MO instance in the agent 10 is deleted in response to an M-DELETE request from the telecommunication-network-management sequence 14, a part of the cache associated with the MO attribute is deleted. Or, when the data in the cache is no longer to be used, the area in the cache associated with the MO attribute is released by using algorithms such as a least-recently-used (LRU) algorithm by the cache management sequence.

Figure 7:
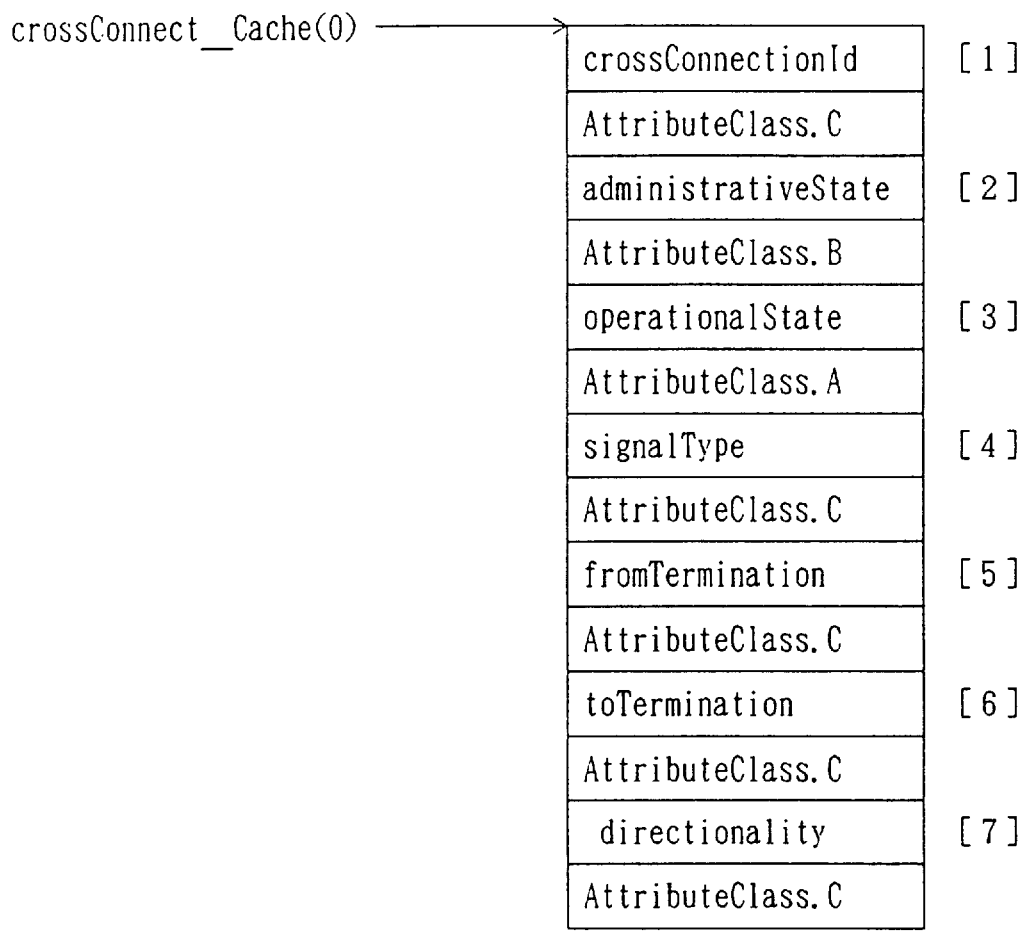
FIG. 7 shows an example of a cache in a memory associated with a crossConnect MO attribute shown in FIG. 5.

FIG. 7 shows an example of the cache in the memory associated with the crossConnect MO attribute shown in FIG. 5. In FIG. 7, crossConnect_Cache(o) is a pointer indicating the cache area of the MO. In this pointer, "o" is a pointer for referring to the MO, and the function "crossConnect_Cache( )" is a function for calculating the area in the cache associated with the MO by way of, for example, a hash method. In FIG. 7, areas for crossConnectionId and administrativeState respectively store the attribute content, and areas for AdministrativeClass.C and AdministrativeClass.B respectively indicate each attribute class. Each attribute content can be designated by attribute numbers [1] to [7] shown in FIG. 7. The content of the attribute class designates the coherency protocol to be used. When a request for updating the attribute content is produced from the telecommunication-network-management sequence 14, the telecommunication-network-management system realizing the manager function executes the proper coherency protocol according to the content of the attribute class to maintain the coherency between the MO-attribute content in the agent 10 and that in the cache. Accordingly, the presence of the cache is transparent to a user of the telecommunication-network-management sequence 14.

Figure 8:
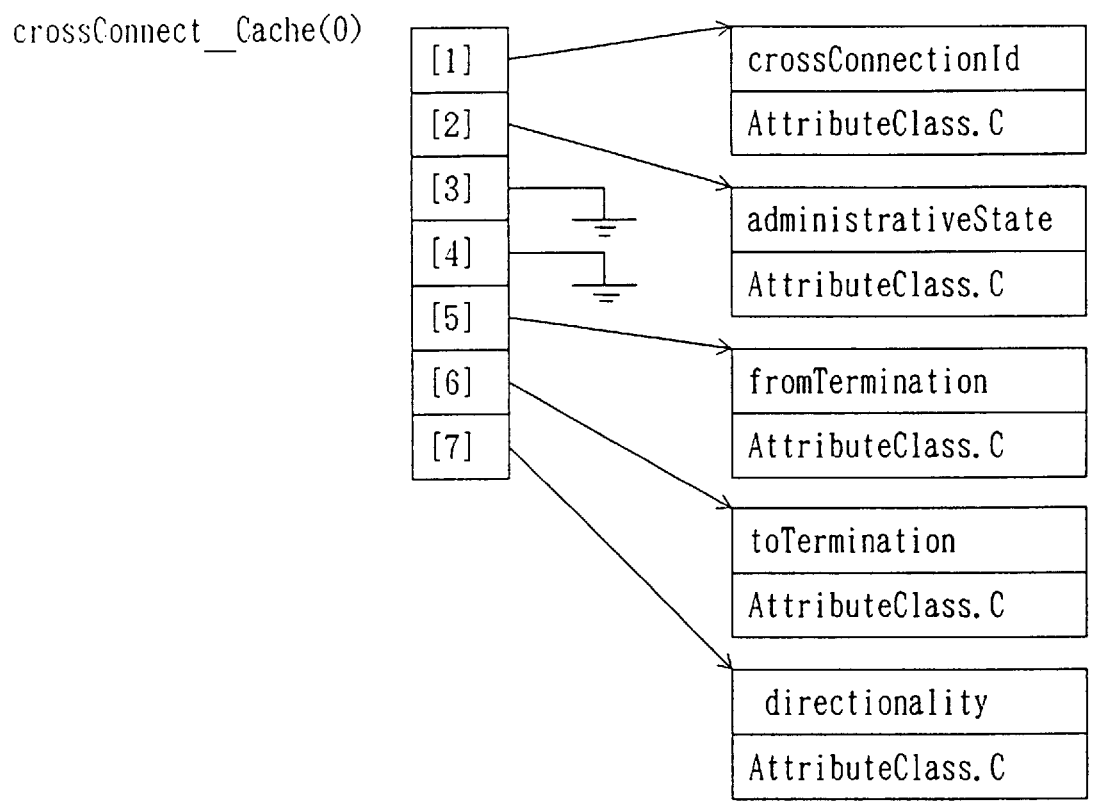
FIG. 8 shows another example of the cache in the memory associated with the crossConnect MO attribute shown in FIG. 5.

FIG. 8 shows another example of the cache in the memory associated with the crossConnect MO attribute shown in FIG. 5. Each attribute which is given the attribute number is indirectly accessed through the pointer in a different way from that shown in FIG. 7. The data indicating each attribute can be located in a certain area of the memory, and the attributes ([3], [4]), which are not used in the manager 12, can be selected so as not to be included in the cache.

Next, a description will be given of the coherency protocol used in each attribute class.

In the attribute class A, a time, which is taken until the contents of two specified caches are identical to each other, is controlled to be equal to or less than a given value (τ). In further detail, at an interval (≦τ), a broadcast is carried out from the agent 10 to the cache 15 in the manager 12 to update the attribute content in the cache 15. This coherency protocol is called a protocol (A).

In the attribute class B, since it is necessary to ensure the exact coherency, a standard coherency protocol using a clock is applied to update the cache 16. In this case, since the agent 10 needs to inform the manager 12 of the change of the attribute content of the MO, a function such as M-Event-Report in CMIP is applicable. This coherency protocol is called a protocol (B).

In the attribute class C, since the coherency between the contents of the caches is always maintained, a communication between the manager and the agent is not necessary and the content of the cache is referred only.

Next, a description will be given of initializing the caches 15 to 17. To minimize the access of the CMIP between the manager 12 and the agent 10, by using the information which is known before compiling starts, the cashes 15 to 17 are initialized in manager__init.c as far as possible.

The attribute-partitioned cache, which is partitioned for each attribute class, is used. To keep interoperability between the unit using the attribute-partitioned cache and a network-management unit which is operative according to the conventional CMIP without using the attribute-partitioned cache, the proper initializing operation in the manager 12 and the agent 10 is necessary. The IDL compiler 22 produces such initializing routines as manager__init.c and agent__init.c.

Figure 9:
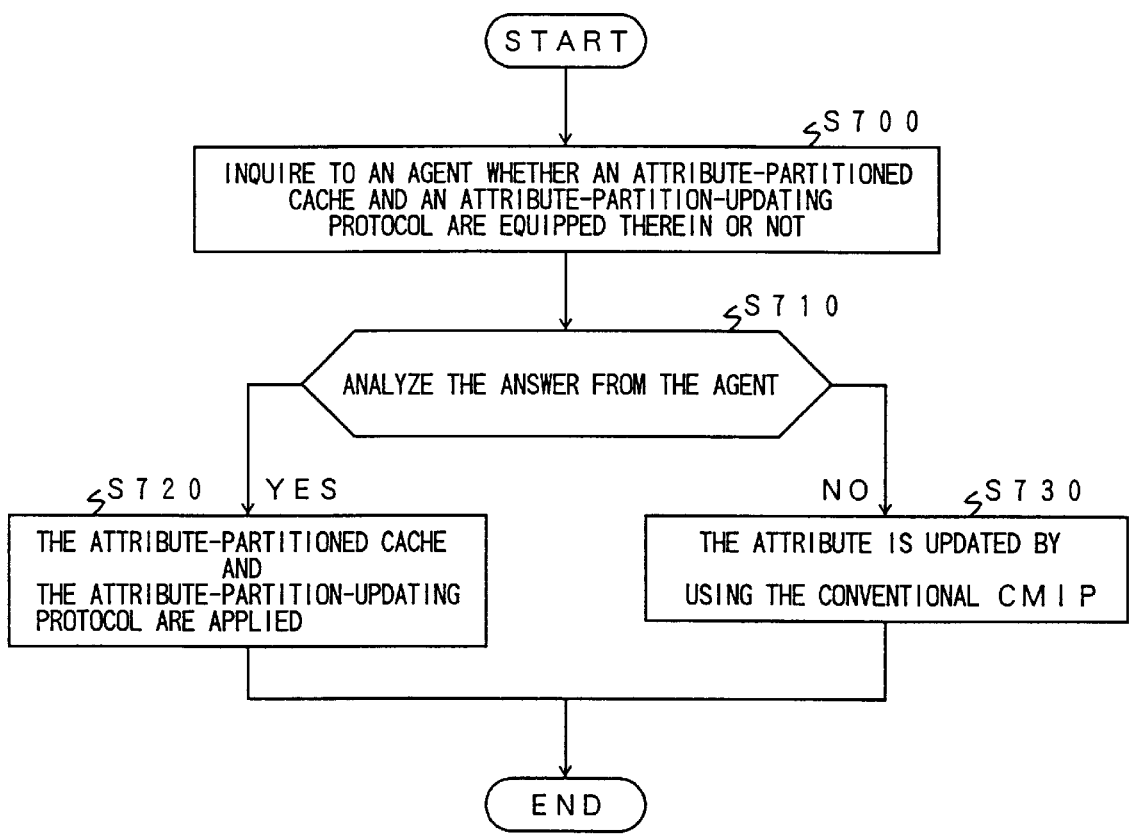
FIG. 9 shows a flowchart of an initializing routine of the manager.

FIG. 9 shows a flowchart of the initializing routine of the manager 12. In FIG. 9, in a step S700, whether the attribute-partitioned cache and an attribute-partition-updating protocol are equipped therein or not is inquired to the agent 10. In a step S710, the answer from the agent 10 is analyzed. When the answer is YES, a step S720 is proceeded to, and the attribute-partitioned cache and the attribute-partition-updating protocol such as protocols (A), (B) are applied. When the answer is NO, a step S730 is proceeded to, and the attribute is updated by using the conventional CMIP.

Figure 10:
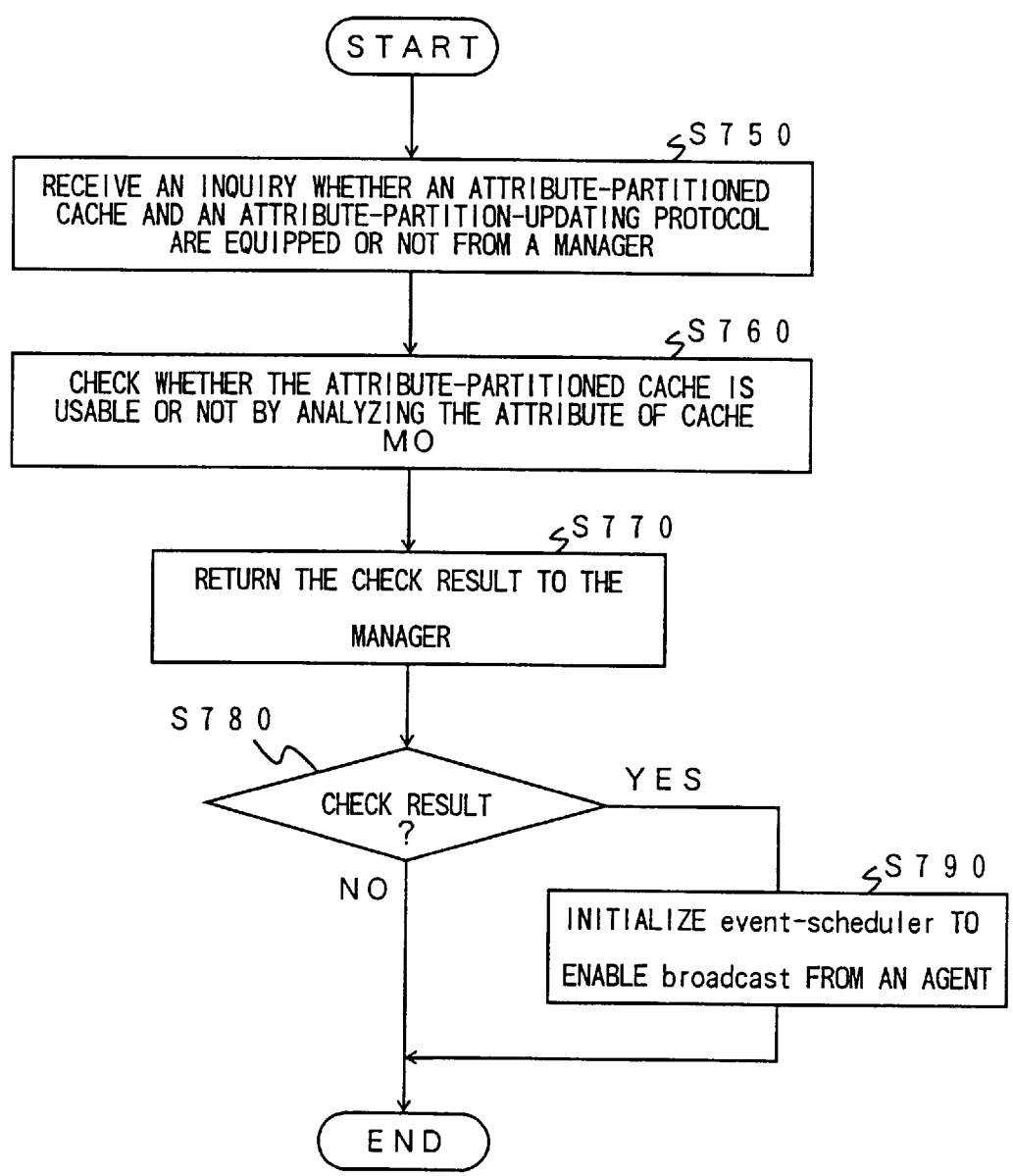
FIG. 10 shows a flowchart of initializing routine of the agent.

FIG. 10 shows a flowchart of the initializing routine of the agent 10. In FIG. 10, in a step S750, an inquiry whether the attribute-partitioned cache and the attribute-partition-updating protocol are equipped or not is received from the manager 12. In a step S760, whether the attribute-partitioned cache is usable or not is checked by analyzing the attribute of the Cache MO representing a usage condition of the cache.

In a step S770, the check result is returned back to the manager 10. In a step S780, the check result is analyzed. When the attribute-partitioned cache is usable, a step S790 is proceeded to, and event__scheduler is initialized to enable the broadcast transmission from the agent 10. When the attribute content is updated, in both the protocols (A), (B), it is necessary to broadcast-transmit the change of the MO-attribute content from the agent 10 to the manager 12. For the above purpose, event__scheduler of the process in the agent 10 is initialized, and the manager 12 is informed of the change of the attribute content by using a function of EventNotification of the CMIP.

Figure 11:
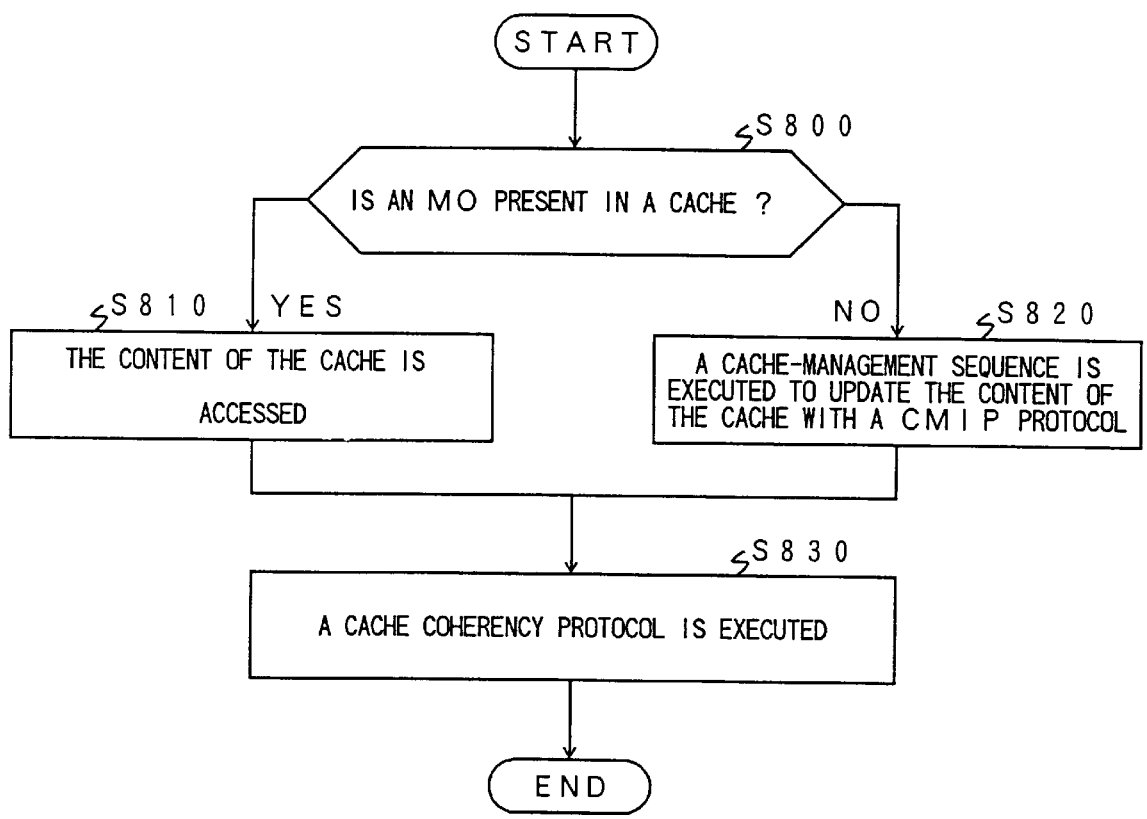
FIG. 11 shows a flowchart of cache access carried out by the manager.

Next, a description will be given of the access of the cache. FIG. 11 shows a flowchart of cache access carried out by the manager 12. In a case of the protocol (A), the cache is accessed by the GET operation and the SET operation, and in a case of the protocol (B), the cache is accessed by the GET operation.

In FIG. 11, in a step S800, by using a hash function, etc., whether a corresponding MO exists or not in the cache is confirmed. When the corresponding MO exists in the cache, a step S810 is proceeded to, and the corresponding MO in the cache is accessed. When no corresponding MO exists in the cache, a step S820 is proceeded to, and the cache management sequence is executed to update the content of the cache by writing the corresponding MO into the cache with the CMIP protocol. After that, in a step S830, the coherency protocol according to the attribute class of each cache, namely the protocol (A) or (B), is executed to ensure the cache coherency.

Next, a description will be given of management of the cache area. The cache is kept in the memory of the manager 12. When the memory area is limited, it is difficult to set all MO attributes to be accessed to the cache. Therefore, by applying a memory-management algorithm such as LRU or CLOCK, the cache can be effectively used. In further detail, when the M-SET and the M-GET are requested from the telecommunication-network-management sequence, if there is a pointer (crossConnect__Cache shown in FIG. 7) to the area in the cache corresponding to the requested MO, the cache of the MO exists. If the pointer is NULL, no cache of the MO exists. When the cache does not exist, the telecommunication-network-management system realizing the manager function, in the same way as that of the attribute class D, performs GET and SET of the MO-attribute content by directly using the CMIP command.

For example, in the case that the LRU memory management is applied, when the cache area is filled up, from the MO attribute whose access history is oldest is deleted among the MO attributes in the cache. And, the pointer to the area in the corresponding cache is reset to NULL to keep the area. The newly released area is kept for the cache of the newly accessed MO attribute.

Figure 12:
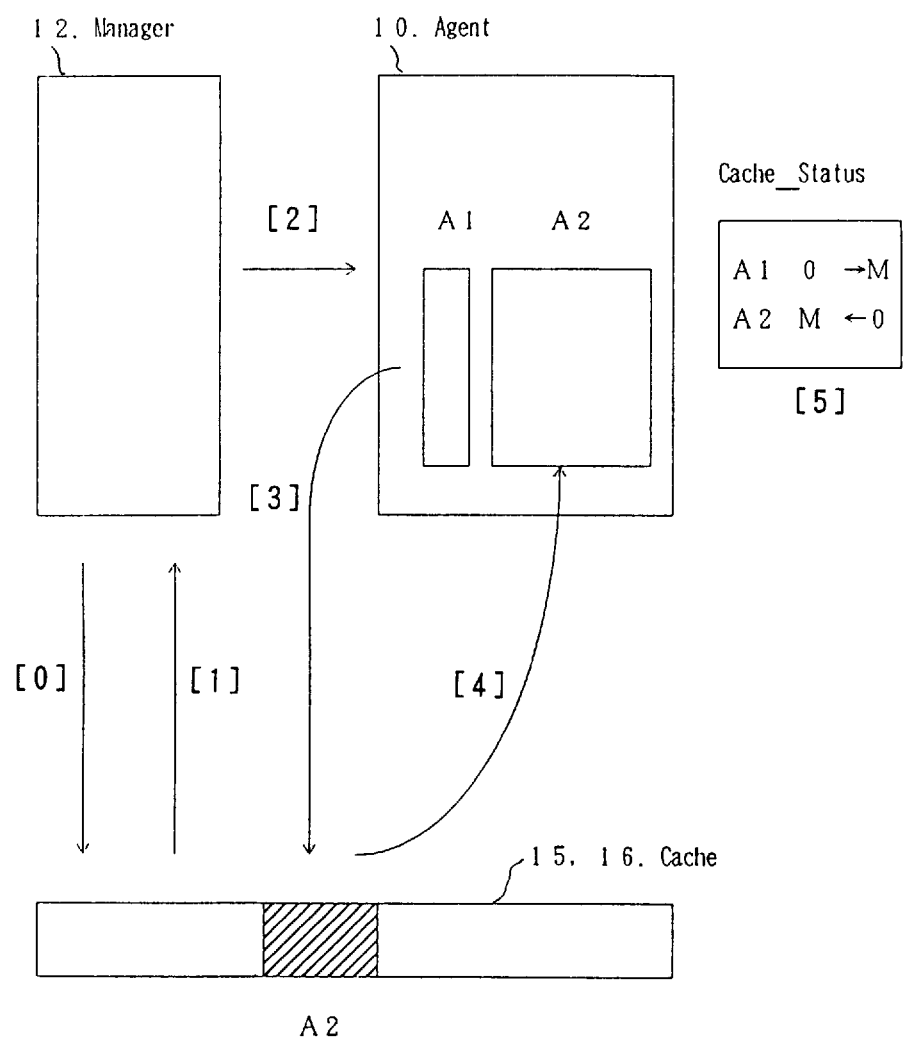
FIG. 12 shows a cache management sequence in a case of using LRU.

FIG. 12 shows the cache management sequence in the case of using LRU. Numbers [0] to [5] shown in FIG. 12 correspond to an executing order of the sequence. In the number [0], the manager 12 analyzes whether the MO attribute to be accessed is present or not in the caches 15, 16. When the response [1] from the caches 15, 16 is NO, in the attribute data of the cache, an area of the attribute A2 whose usage frequency is least is released. At the same time, the MO-attribute content is obtained from the agent 10 by using M-GET [2], and is stored in the released area [3]. In the agent 10, to update the MO-attribute content of the cache by Broadcast in the protocols (A), (B), it is necessary to know which of the managers has the MO attribute in the cache. Therefore, the manager 12 informs the updated cache status to the agent 10 [4], and in response to the information, the agent 10 updates a table (Cache__Status) indicating the cache status [5]. As shown in FIG. 12, Cache__Status is the table indicating the attributes (A1, A2) which are allowed to be cached and a group of managers caching these attributes. "M" represents the ID of the manager. As a result of the management sequence, for the attribute A1, Cache__Status is changed from "0" to "M", and for the attribute A2, from "M" to "0".

Figure 13:
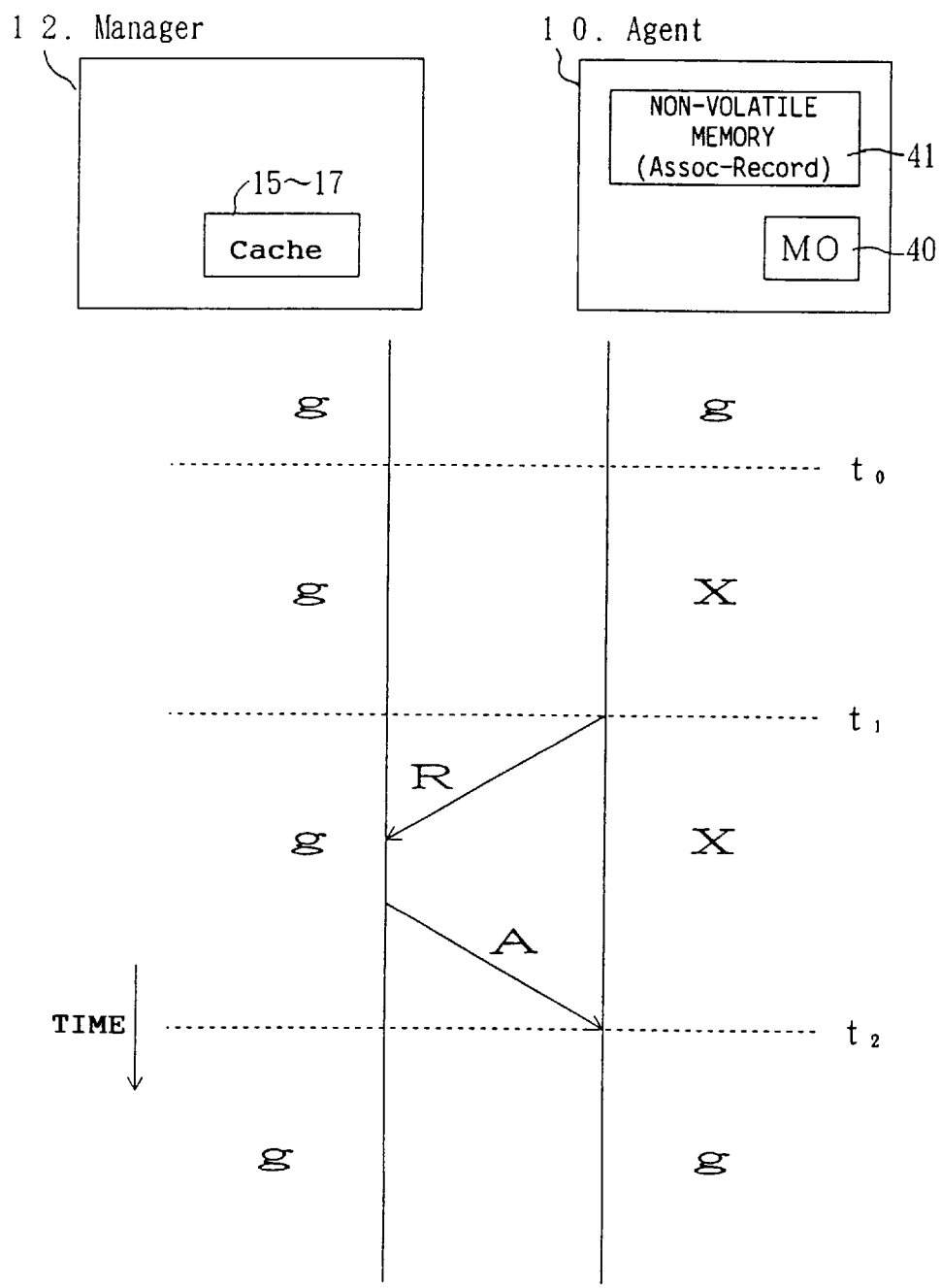
FIG. 13 shows an illustration for explaining a trouble restoration in the agent.
Figure 14:
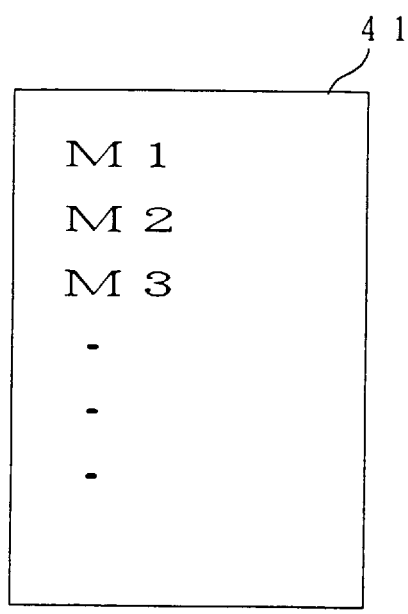
FIG. 14 shows a storage formation of a nonvolatile memory shown in FIG. 13.

Next, a description will be given of problem fixing in the agent by referring to FIGS. 13 and 14. FIG. 13 shows an illustration for explaining the problem fixing in the agent. FIG. 14 shows a storage format of a non-volatile memory shown in FIG. 13. In FIG. 13, the manager 12 has the attribute content of an MO 40 of the agent 10 in the caches 15 to 17, and before $t_0$, the attribute of the MO is identical to that of the cache, both being "g".

The agent 10 stores association information about the manager 12 in a non-volatile memory (non-volatile storage means) 41. As shown in FIG. 14, in this association information, names (manager ID) M1, M2, M3 of the managers, which were communicating with the agent 10 when the problem occurred, are recorded.

For example, at the time $t_0$, the trouble occurs in the agent 10, and the attribute content of the MO 40 becomes indefinite (X). At a time $t_1$, after the problem in the agent 10 is fixed, the agent 10 searches the non-volatile memory 41 to restore the MO-attribute content to its old content before the problem occurred. And the agent 10 sends an inquiry to the managers M1, M2, M3 which seem to have the cache by using the CMIP (R). If one of the managers has the cache 15, 16, 17 corresponding to the inquired MO attribute, the manager returns the content (A) of the cache to the agent 10. In this way, after a time $t_2$, the attribute content of the MO 40 of the agent 10 may be restored to the old content (g) before the problem occurred. After that, it operates based on the conventional coherency protocol.

Figure 15:
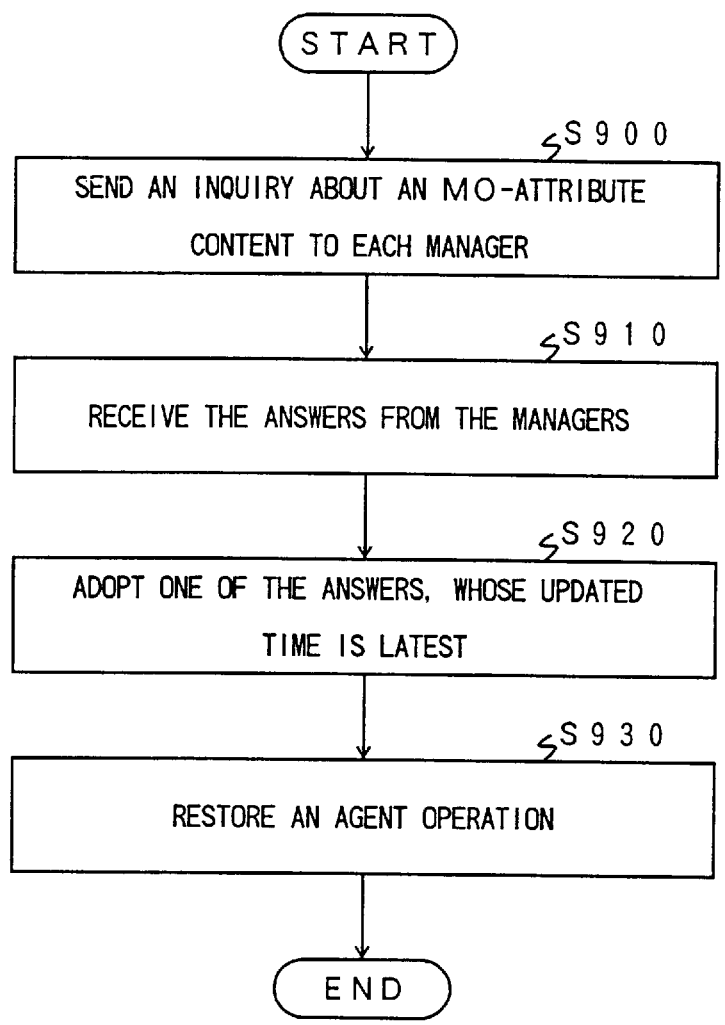
FIG. 15 shows a flowchart of the trouble restoration in the agent.

FIG. 15 shows a flowchart of the problem fixing in the agent 10. After the problem occurs in the agent 10 and the trouble is restored, the restoration process starts. In a step S900, to the manager whose name is recorded in the non-volatile memory 41, the MO-attribute content thereof is inquired about. If a non-volatile backup unit is connected to the agent 10, the MO-attribute content thereof is also inquired about. In a step S910, the answers from the inquired managers and non-volatile backup unit are received. In a step S920, when plurality answers are received for the same MO attribute, one of the answers, in which an updated time of the MO attribute, namely a commit time, is latest, is adopted. It is a reason why in a case of the attribute using the protocol (A), incoherency between the attribute contents of the caches in each managers is temporarily present. In a step S930, according to the adopted answer, the MO 40 is restored and the agent operation is also restored.

By utilizing the cache in the manager for the backup when the problem occurs, tolerance against the trouble and reliability of the network may be improved without installing a specific mechanism.

When the problem occurs in the manager 12, the restoration process is performed in the same way as that of the agent 10. In this case, the coherency protocol automatically operates by the conventional manager_init.c to restore the content of the cache to the old content before the problem occurred.

Figure 16:
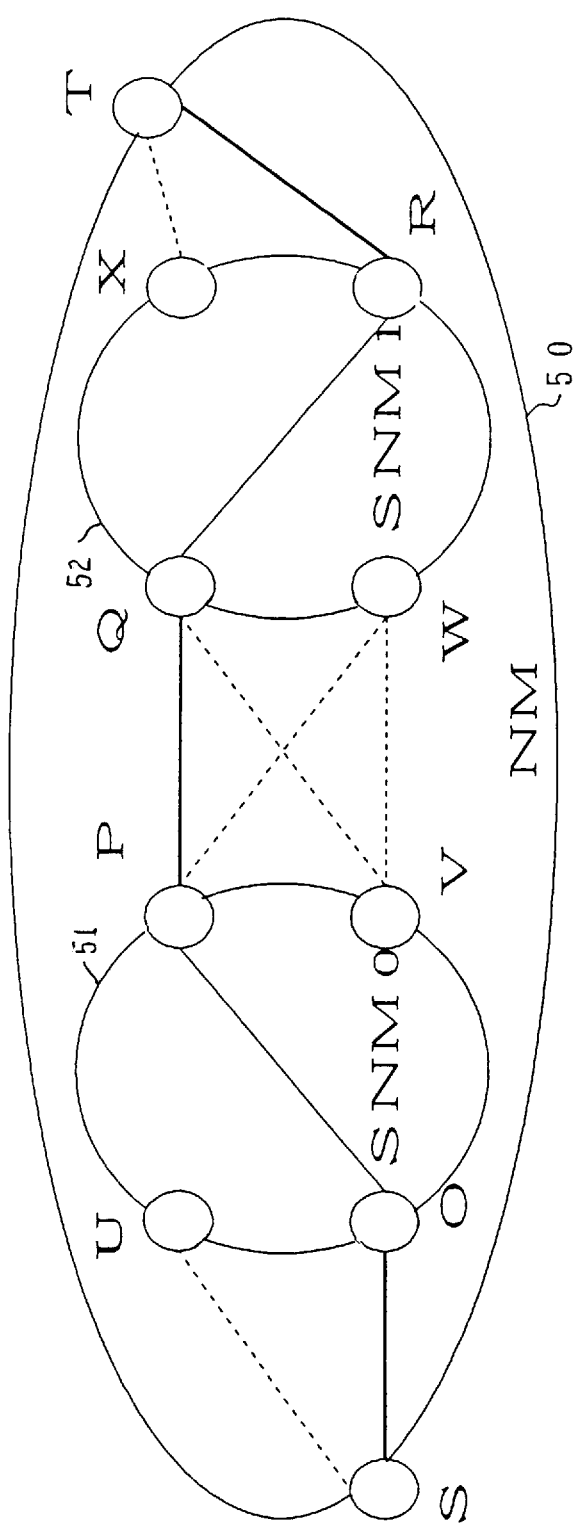
FIG. 16 shows a configuration of a hierarchal network.

Next, a description will be given of a hierarchal network to which the method according the present invention is applied. FIG. 16 shows a configuration of the hierarchal network. In FIG. 16, a network 50 is partitioned into plurality domains, each of which constitutes sub-networks 51, 52. "NM" represents a manager of the network 50, "SNM0", "SNM1" represent managers of the sub-networks 51, 52, respectively, "S", "T" represent respectively connect units of network termination points (TTPs), and "O", "P", "U", "V" represent respectively connect units of termination points (CTP) of domain boundaries.

Path setting between the network termination points S and T is performed in the following processes.

(1) path search,
(2) MO generation such as Trail (transmission line), CTP, and TTP indicating path information, and
(3) path conduction (Activate).

In the path search (1), to select an optimum path whose cost is least, the NM requires cost information of the paths (paths O-P and Q-R) in the SNM. A portion of MOs generated in the process (2) is accessed from both the NM and the SNM for management. For example, the above portion of the MOs includes the MO of the cross-connect units on the domain boundaries such as O, P, Q, R. In FIG. 16, the NM, the SNM0, and the SNM1 are managers, and O, P, Q, R are agents.

Figure 17A:
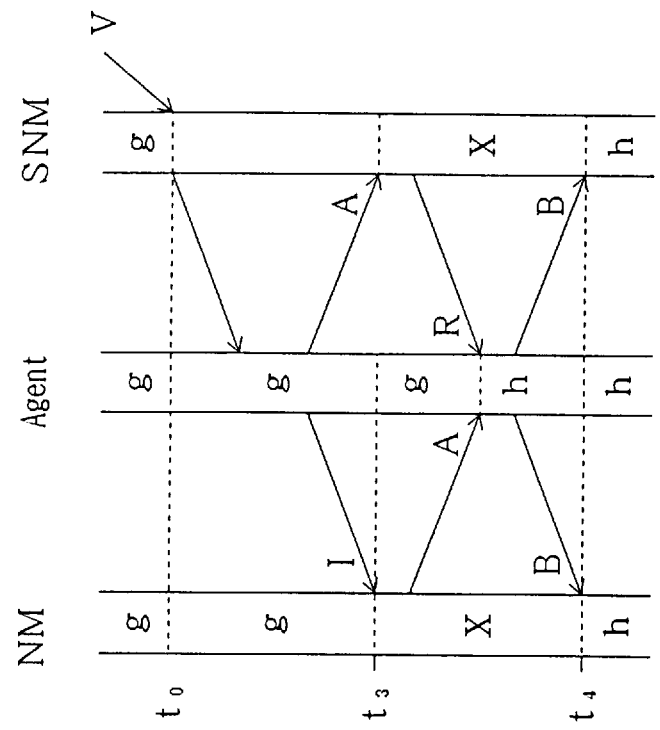
FIGS. 17A and 17B show attribute updating sequences for respective SNMs shown in FIG. 16.
Figure 17B:
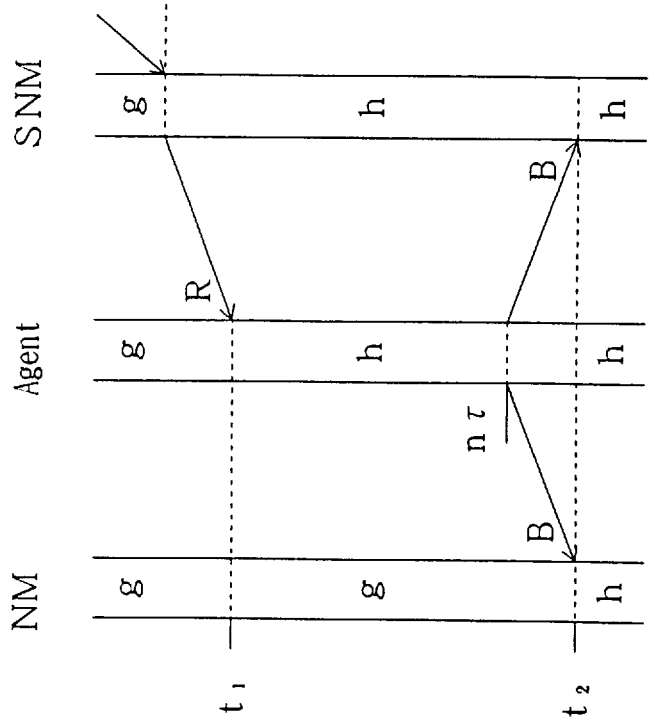

In this network configuration, the MO attributes are partitioned according to the coherency request, and the different coherency protocols are applied to the respective classes. FIGS. 17A and 17B show attribute updating sequences for the respective SNMs. Such sequences, when the SNM performs a management sequence in relation to the sub-network of the management domain, are necessary to change the MO-attribute content of the cross-connect unit in the domain boundaries.

The above situations include cases in which the SNM0 changes the attribute contents of O, P, U, V, and the SNM1 changes the attribute contents of Q, R, W, X in an example shown in FIG. 16. In FIG. 17B, only one case in which a content of a cache is updated exactly in the attribute class B is shown. In fact, when plurality managers have the caches, the content of the cache is not always updated exactly. More specifically, though a lock request is needed to prevent the plurality managers from simultaneously writing into the agent, when the lock is not provided, the sequence fails. When the sequence fails, the sequence is discontinued to restart it.

In the embodiment shown in FIG. 16, the attribute class A includes attributes which have been partitioned into the attribute class A of the crossConnection MO attributes as shown in FIG. 5. the attribute class A further includes the cost table indicating the cost information in relation to the passes in the SNM for the pass search. The attribute class B includes attributes which have been partitioned into the attribute class B of the crossConnection MO attributes as shown in FIG. 5.

In the examples shown in FIGS. 17A, 17B, message changes between the NM, the agent, and the SNM are shown for each attribute class A, B. "Agent" represents an agent in the CMIP, and indicates the cross-connect unit such as Q to R, U to X. In this drawing, the MO and its attribute content are located in the Agent, and the NM and the SNM have the cache corresponding to the MO attribute in their memories.

In FIGS. 17A, 17B, when the sequence starts (before a time $t_0$), the MO-attribute content is g, and from the management sequence executed in the SNM, writing (V), which changes the MO-attribute content to h, is produced. In these drawings, values (g, h, X) under the NM, the Agent, and the SNM represent the cache content corresponding to the MO attribute in the NM, the attribute content of the MO in the Agent, and the cache content corresponding to the MO attribute in the SNM. "X" indicates that the cache is null and cannot be read out. Meanings of message class, symbols, and time in the sequence shown in FIGS. 17A, 17B are given in the following.

g, h: the attribute content of the MO, or the cache content corresponding to the MO;

X: cache null status, reading is not permitted;

V: writing request of the MO attribute in the management sequence of the SNM;

nτ: a instant time when a broadcast is carried out from the Agent to the NM at time interval;

R: the update request of the attribute content from the SNM to the Agent (Update Request);

L: the lock request from the SNM to the Agent (Lock Request);

I: a cache invalid request from the Agent to the NM (Invalid Request);

A: an acknowledgement for the messages L, I from the Agent to the SNM (Acknowledgement); and B: the broadcast of a newly updated attribute content (Broadcast).

In FIG. 17A, at a time $t_1$, the update request from the SNM has arrived at the Agent. At a time $t_2$, the cache content in the NM and the SNM are updated (by the broadcast which is carried out from the Agent at a time interval ($\leq \tau$)). During the time interval from $t_1$ to $t_2$, the MO in the Agent is not identical to the caches in the NM and the SNM.

In FIG. 17B, at a time $t_3$, the cache in the NM is invalidated by the message I from the Agent. When the Agent broadcasts the new value h by the message B, it is necessary to confirm that all caches in the NM and the SNM are invalidated. Namely, before the message B is transmitted, the messages A, R from the NM and the SNM need to arrive at the Agent. At a time $t_4$, the cache updates of the NM and the SNM are finished, and the caches in the NM and the SNM become valid again. During the time interval from $t_3$ to $t_4$, the cache cannot be read out.

Though FIGS. 17A, 17B show only the cases of the attribute classes A and B, sequences in the cases of the attribute classes C and D are evident. In the case of the attribute class C, based on the definition thereof, the writing sequence is not generated. In the case of the attribute class D, by using the conventional M-SET command of the CMIP, the manager changes the attribute content of the MO in the agent.

In this way, the number of the messages for maintaining the cache coherency necessary in the attribute class A is extremely less than that in the attribute class B. Since the attribute in the attribute class C needs no message for maintaining the coherency, the number of the messages in the coherency protocol is decreased to one tenth. Therefore, the management sequence can be carried out in the higher speed with preventing the network from falling into the congested condition. Since the above mentioned coherency protocols can be realized by using the CMIP, the method of controlling telecommunication network management according to the present invention may be introduced maintaining the protocol stack of the CMIP, namely without changing the present telecommunication-network-management system.

Figure 18A:
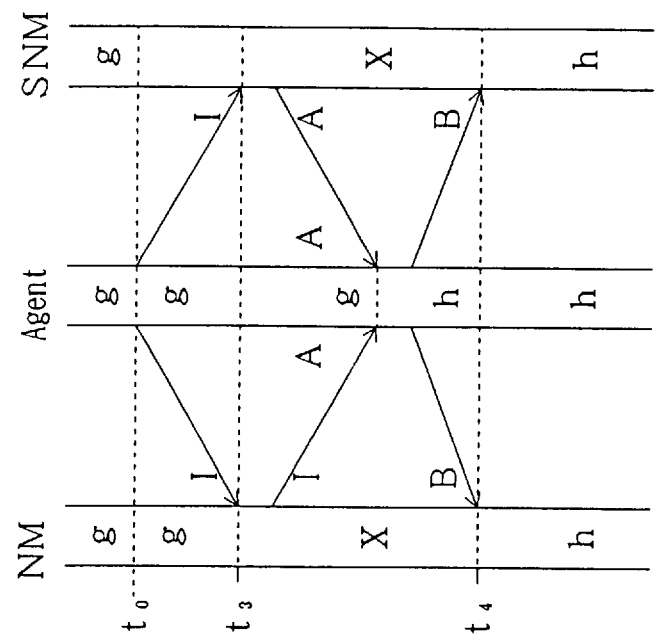
FIGS. 18A and 18B respectively show sequences of the attribute classes A and B in cases that an Agent spontaneously changes the attribute content at the time $t_0$.
Figure 18B:
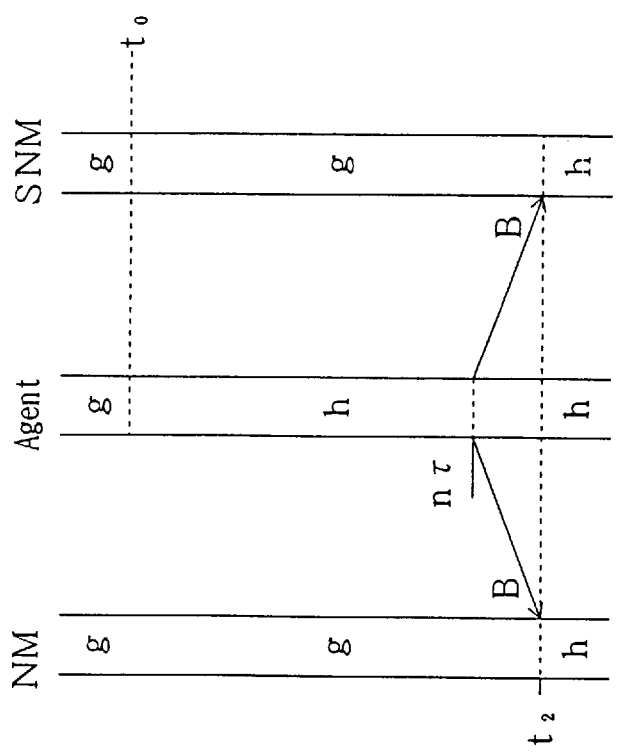

FIGS. 18A and 18B respectively show sequences of the attribute classes A and B in cases that the Agent spontaneously changes the attribute content at the time $t_0$.

In FIG. 18A, at the time $t_0$, the attribute content is changed from g to h in the Agent. At the time $t_2$, by the periodical broadcast from the agent, the caches in the NM and the SNM are updated. During $t_0$ to $t_2$, the MO in the Agent is not identical to the caches in the NM and the SNM.

In FIG. 18B, at the $t_3$, the cache in the NM is invalidated by the message I from the Agent. After that, when the messages A from the NM and the SNM arrive at the Agent, the Agent broadcasts the messages B to the NM and the SNM. At the time $t_4$, the cache updates of the NM and the SNM are finished, and the caches in the NM and the SNM becomes valid again.

Figure 19B:
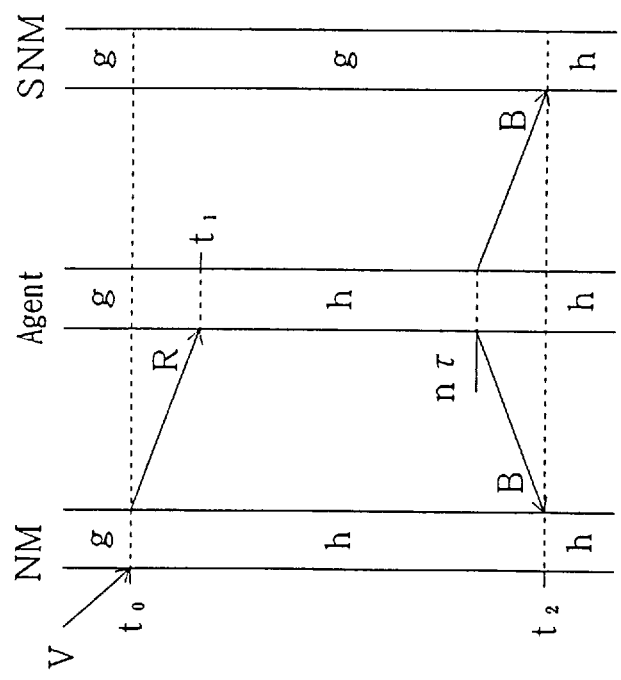
FIGS. 19A and 19B respectively show sequences of the attribute classes A and B in cases that the NM changes the attribute content at the time $t_0$.
Figure 19A:
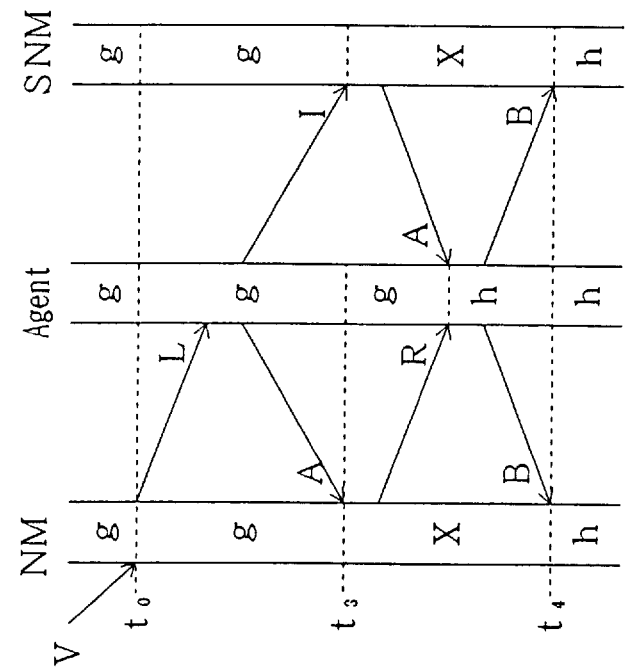

FIGS. 19A and 19B respectively show sequences of the attribute classes A and B in cases that the NM changes the attribute content at the time $t_0$.

In FIG. 19A, at the time $t_1$, the update request from the NM has arrived at the Agent. At the time $t_2$, the cache content in the NM and the SNM are updated (by the broadcast is carried out from the Agent at the time interval ($\leq \tau$)). During the time interval from $t_1$ to $t_2$, the MO in the Agent is not identical to the caches in the NM and the SNM.

In FIG. 19B, at the time $t_3$, the cache in the SNM is invalidated by the message I from the Agent. When the Agent broadcasts the new value h by the message B, it is necessary to confirm that all caches in the NM and the SNM are invalidated. Namely, before the message B is transmitted, the messages A, R from the NM and the SNM need to arrive at the Agent. At the time $t_4$, the cache updates of the NM and the SNM are finished, and the caches in the NM and the SNM become valid again. During the time interval from $t_3$ to $t_4$, the cache cannot be read out.

FIGS. 20A and 20B respectively show sequences of the attribute classes A and B in cases that the read request is generated when the management sequence is executed in the SNM.

In response to the generated read request (V) at the time $t_0$, the cache content (g) in the SNM is immediately returned (W). This operation is carried out in the attribute classes A, B, and C, in the same way. Because, the cache coherency protocol ensures that the MO-attribute content in the Agent and the cache contents in the NM and the SNM are the same (at g). In the case of the attribute class D, by using the conventional M-GET command in the CMIP, the manager reads out the attribute content in the Agent.

FIGS. 21A and 21B respectively show sequences of the attribute classes A and B in cases that the read request is generated when the management sequence is executed in the NM.

In response to the generated read request (V) at the time $t_0$, the cache content (g) in the NM is immediately returned (W). This operation is carried out in the attribute classes A, B, and C, in the same way. Because, the cache coherency protocol ensures that the MO-attribute content in the Agent and the cache contents in the NM and the SNM are the same (at g). In the case of the attribute class D, by using the conventional M-GET command in the CMIP, the manager reads out the attribute content in the Agent.

In this way, by partitioning the attribute, and using the cache, the time for reading the attributes content may be extremely reduced as compared to that of the conventional method, and the number of the messages of the CMIP between the manager and the agent in the reading may be also reduced.

According to the present invention, by using the cache, the extremely high-speed execution of the management sequence may be achieved while reducing the number of messages of the coherency protocol. This makes it possible to carry out the telecommunication network management with the extremely high speed. Furthermore, by using the cache as the backup when the trouble occurs, the trouble may be restored more easily and more efficiently. This makes it possible to improve the reliability of the telecommunication network.

As described above, the present invention has the following features.

By locating the cache in the manager, the manager may execute the management sequence with the extremely high speed. By partitioning the attributes of the management information into attribute classes corresponding to demands for the cache coherency, the cache management may be optimized.

The initializing element is automatically generated by the definition of the management information, thereby the cache which was partitioned into the attribute classes is kept in the manager, and the cache is initialized. Therefore, interoperability with the unit using no partitioned cache may be achieved.

The interface processing element is automatically generated by the definition of the management information, thereby the coherency protocol for each attribute class is executed. Therefore, the proper coherent protocol may be executed for each attribute class.

The cache coherency is ensured by using the proper coherency protocol corresponding to each attribute class. Therefore, this may prevent the management traffic of the network from increasing, and, thus, may suppress an increase in the network load.

The partitioned cache is managed based on the least-recently-used algorithm. Therefore, this may prevent the cache area from increasing, and, thus, may enable an effective memory use.

The agent includes the non-volatile storage element. Therefore, when the problem occurs in the agent, the information of the manager connected to the agent may be kept.

After the problem which occurred in the agent is being fixed, the management information of the agent is restored by using the cache in the manager. Therefore, the cache may be effectively utilized for the problem fixing in the agent.

Further, the present invention is not limited to these embodiments, but various variations and modifications may be made without departing from the scope of the present invention.

What is claimed is:

1. A method of controlling telecommunication network management; wherein a managing subject is provided with a management sequence to control communication related management information of a telecommunication network by controlling an agent subject, said method comprising the steps of:

providing a cache for storing said management information in said managing subject; and classifying attributes of said management information according to attribute class, each class corresponding to its tolerance for cache coherency error determined by a requirement from a program to control the management sequence;

wherein said managing subject carries out said management sequence with a higher speed by accessing said cache, and manages a cache area for each attribute class efficiently.

2. The method as claimed in claim 1, wherein said agent subject comprises non-volatile storage means for storing information of said managing subject connected to the agent subject.

3. The method as claimed in claim 1, wherein said method further comprises the step of automatically generating initializing programs for providing a cache area for each attribute class and setting an initial value in the cache area by determining said attribute class form a definition of said management information.

4. The method as claimed in claim 1, wherein said method further comprises the step of automatically generating interface processing programs for executing a coherency protocol for each attribute class by determining said attribute class from a definition of said management information.

5. The method as claimed in claim 1, wherein said method further comprises the step of ensuring said cache coherency by using a coherency protocol corresponding to each attribute class.

6. The method as claimed in claim 1, wherein said method further comprises the step of managing said cache based on a least-recently-used algorithm.

7. The method as claimed in claim 2, wherein said method further comprises the step of restoring the management information stored in the non-volatile memory of the agent subject with the management information stored in the cache of the managing subject, after a problem occurred in the agent subject has been fixed.

* * * * *